US008062745B2

(12) United States Patent
McGee et al.

(10) Patent No.: US 8,062,745 B2
(45) Date of Patent: Nov. 22, 2011

(54) THERMOPLASTIC OLEFIN POLYMER BLEND AND ADHESIVE FILMS MADE THEREFROM

(75) Inventors: Robert L. McGee, Midland, MI (US); Allen W. Ross, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 466 days.

(21) Appl. No.: 11/663,375

(22) PCT Filed: Sep. 26, 2005

(86) PCT No.: PCT/US2005/034294
§ 371 (c)(1),
(2), (4) Date: Mar. 20, 2007

(87) PCT Pub. No.: WO2006/041654
PCT Pub. Date: Apr. 20, 2006

(65) Prior Publication Data
US 2008/0103258 A1    May 1, 2008

(51) Int. Cl.
*B32B 15/04* (2006.01)
*B32B 7/12* (2006.01)
*B32B 27/30* (2006.01)
*B32B 27/32* (2006.01)

(52) U.S. Cl. ........ 428/343; 428/354; 428/355; 428/520; 428/522; 428/515; 428/523

(58) Field of Classification Search .................. 525/222; 428/522, 523, 520, 355 AC, 355 RA; 156/332, 156/327, 515
See application file for complete search history.

(56) References Cited

U.S. PATENT DOCUMENTS

| | | | | |
|---|---|---|---|---|
| 4,647,509 A * | 3/1987 | Wallace et al. | ............. | 428/474.9 |
| 4,684,554 A * | 8/1987 | Ou-Yang | ...................... | 428/34.2 |
| 5,173,391 A * | 12/1992 | Hiraoko et al. | ................ | 430/200 |
| 5,670,566 A * | 9/1997 | Liedermooy et al. | ......... | 524/271 |
| 5,993,949 A * | 11/1999 | Rosenbaum et al. | ......... | 428/213 |
| 6,572,965 B1 * | 6/2003 | McGee et al. | ................. | 428/343 |
| 6,630,237 B2 * | 10/2003 | Rivett et al. | ............. | 428/355 EN |
| 6,653,523 B1 * | 11/2003 | McCormack et al. | ......... | 604/367 |
| 6,770,342 B2 * | 8/2004 | Buongiorno | ................ | 428/36.6 |
| 2001/0051248 A1 * | 12/2001 | Jerdee et al. | .................... | 428/97 |
| 2002/0068182 A1 * | 6/2002 | Kelch et al. | ................... | 428/463 |
| 2002/0132071 A1 * | 9/2002 | Buongiorno | ................ | 428/35.2 |
| 2003/0091760 A1 * | 5/2003 | Drogou et al. | ................ | 428/34.2 |
| 2003/0099840 A1 * | 5/2003 | Dey et al. | ...................... | 428/421 |
| 2004/0086675 A1 * | 5/2004 | Ling et al. | ................. | 428/36.91 |

OTHER PUBLICATIONS

Flyer "Lotryl" Grades.*
Optema TC-221 flyer.*

* cited by examiner

*Primary Examiner* — Vasu Jagannathan
*Assistant Examiner* — Irina Krylova

(57) ABSTRACT

Blend an ethylene/alkyl acrylate copolymer and an ethylene/ $\alpha,\beta$-ethylenically unsaturated carboxylic acid copolymer in a weight ratio of more than 1:1 and convert the blend to a film that has adhesive properties. The film is particularly suitable for use as an external adhesive layer in a multilayer film structure. Such multilayer film structures may be used, for example as a strippable protective film for any of a variety of surfaces such as freshly painted metal surfaces.

15 Claims, No Drawings

THERMOPLASTIC OLEFIN POLYMER BLEND AND ADHESIVE FILMS MADE THEREFROM

This invention relates generally to a thermoplastic olefin polymer blend composition, particularly to blends of an ethylene/alkyl acrylate copolymer and an ethylene/alpha, beta-ethylenically unsaturated carboxylic acid (ethylene/α, β-ethylenically unsaturated carboxylic acid copolymer) (for example acrylic acid) copolymer, and more particularly to such blends where the ethylene/alkyl acrylate copolymer is present in an amount of more than 50 percent by weight, based on combined weight of the ethylene/alkyl acrylate copolymer and the ethylene/ethylenically unsaturated carboxylic acid copolymer. This invention also relates to monolayer films of such blends, particularly when such films are extrusion cast on a surface, and to multi-layer films that include an external adhesive layer formed from such blends.

A first aspect of this invention is a polymer blend composition comprising an ethylene/alkyl acrylate copolymer and an ethylene/α, β-ethylenically unsaturated carboxylic acid copolymer, the ethylene/alkyl acrylate copolymer having a Vicat point (ASTM D1525) of no more than 40° centigrade and being present in an amount of from greater than 50 percent by weight to 75 percent by weight, and the ethylene/α, β-ethylenically unsaturated carboxylic acid copolymer being present in an amount of from 25 percent by weight to 50 percent by weight, both percentages being based upon combined weight of ethylene/alkyl acrylate copolymer and ethylene/acrylic acid copolymer and selected to total 100 percent by weight. The polymer blend may be converted to a polymer film, for example by extrusion processing into a film or onto a substrate or collection surface.

A second aspect of this invention is a multilayer film structure comprising a melt barrier layer, the melt barrier layer having a first major planar surface and, spaced apart from and generally parallel to the first major planar surface, a second major planar surface, and an adhesive film layer comprising the polymer blend composition of the first aspect of the invention, the adhesive layer having a first major planar surface and, spaced apart from and generally parallel to the first major planar surface, a second major planar surface, a major planar surface of the melt barrier layer being directly bonded to a major planar surface of the adhesive film layer A third aspect of this invention is a strippable adhesive film that comprises the multilayer film structure of the second aspect. The strippable adhesive film may be used to protect surfaces such as freshly painted wood, wood product, or cementitious surfaces, or painted metal surfaces, or plastic surfaces. Paints suitable for use in preparing for such painted surfaces include acrylic paints and epoxy-based paints.

Where ranges are stated in this Application, the ranges include both endpoints of the range unless otherwise stated.

As used herein, "coextrusion," and "coextrude," refer to the process of extruding two or more materials through a single die with two or more orifices arranged so that the extrudates merge and weld together into a laminar structure before cooling or chilling, that is, quenching. Coextrusion is often employed as an aspect of other processes, for instance, in blown film and cast film processes.

As used herein, "copolymer" refers to polymers having two different monomers polymerized therein, "terpolymer" refers to polymers having three different monomers polymerized therein and "tetrapolymer" refers to polymers having four different monomers polymerized therein. "Interpolymer", as used herein, collectively includes copolymer, terpolymers, tetrapolymers and other polymers having five or more different monomers polymerized therein.

Polymer blends of the present invention comprise at least two copolymers, an ethylene/alkyl acrylate copolymer and an ethylene/α, β-ethylenically unsaturated carboxylic acid copolymer. The polymer blends contain a major portion, more than 50 percent by weight based on combined weight of the two copolymers, of the ethylene/alkyl acrylate copolymer. In other words, the blends have more ethylene/alkyl acrylate copolymer than ethylene/α, β-ethylenically unsaturated carboxylic acid copolymer. If the blends contain less than 50 wt % of a low Vicat point polymer, such as an ethylene/alkyl acrylate copolymer, optionally in admixture with an ethylene α-olefin copolymer with a Vicat point of less than 40° centigrade (° C.),for example, ethylene propylene elastomer, then the properties of the blend tend to be governed by the ethylene/α, β-ethylenically unsaturated carboxylic acid copolymer, a tendency that leads to less than desirable low temperature properties.

The ethylene/alkyl acrylate copolymer has a Vicat point or Vicat softening point temperature of no more than 40° centigrade (° C.). Determine Vicat point according to American Society for Testing and Materials (ASTM) test method D1525. The amount of alkyl acrylate that will yield such a Vicat point varies depending upon the alkyl acrylate. The alkyl acrylate is preferably selected from the group consisting of methyl acrylate, butyl acrylate and 2-ethylhexyl acrylate. Preferred alkyl acrylate contents, based on copolymer weight, range from: 26 to 31 percent by weight (wt %) methyl acrylate, 33 to 37 wt % butyl acrylate and 34 to 38 wt % 2-ethylhexyl acrylate. With alkyl acrylate amounts lower than (<) the above contents, the copolymers tend to be more crystalline and have Vicat points in excess of 40° C. With alkyl acrylate amounts greater than (>) the above contents, the copolymers tend to become liquid and lose their solid resinous character. Atofina produces and sells ethylene/methyl acrylate copolymers and ethylene/butyl acrylate copolymers under the trade designation LOTRYL™ and 2-ethylhexyl acrylate copolymers under the trade designation (LOTRYL EH™).

Preferred ethylene/α, β-ethylenically unsaturated carboxylic acid copolymers include ethylene/acrylic acid (EAA) copolymers and ethylene/methacrylic acid (EMAA) copolymers with EAA copolymers being especially preferred. The EAA copolymers have an acrylic acid (AA) content, based upon copolymer weight, that is preferably from 5 to 22 wt %, more preferably from 6 to 21 wt % and still more preferably from 9 to 21 wt %. If desired, two or more EAA copolymers may be blended to provide a desired AA content. An AA content<5 wt % tends to have inadequate adhesive properties and a higher melting point which may make the product more difficult to apply and would likely have poorer peel strength at low temperatures. An AA content>22 wt % is generally not available commercially. The Dow Chemical Company produces and sells EAA copolymers with an AA content of 5 wt % to 20.5 wt % as well as EAA copolymer blends under the trade designation PRIMACOR™.

The blends of the present invention may, if desired, also contain an amount of a polyolefin elastomer, such as ethylene/propylene elastomers available from The Dow Chemical Company. When the polyolefin elastomers are included in blends of the present invention, they are present in an amount that does not overwhelm desirable attributes of the ethylene/alkyl acrylate polymer. Any amount up to 30% may be used. Preferred amounts fall within a range of from 10 wt % to 20 wt %, based upon total blend weight. The polyolefin elastomers have a Vicat point of no more than 40° C., more preferably less than 20° C. The ethylene/propylene elastomers have an ethylene content that preferably falls within a range of from 5 wt % to 20 wt %, more preferably within a range of from 12 wt % to 17 wt %, in each case based upon ethylene/propylene elastomer weight.

The polymer blends of the present invention preferably comprise an adhesive film layer, especially an outer adhesive layer, of a multilayer film structure. The multilayer film structure comprises at least one layer, a melt barrier layer, in addition to the adhesive layer. The multilayer film layer may also comprise an intermediate core layer. Each of the melt barrier layer, the adhesive film layer and, when present, the intermediate core layer has a first major planar surface and, spaced apart from and generally parallel to the first major planar surface, a second major planar surface. In a two layer structure that comprises only the melt barrier layer and the adhesive film layer, one of the two major planar surfaces of the adhesive film layer is in operative, preferably adhesive, contact with a major planar surface, either the first major planar surface or the second major planar surface, of the melt barrier layer. In a three layer structure that comprises, in order, a melt barrier layer, an intermediate core layer and an adhesive film layer, one of the two major planar surfaces of the intermediate core layer is in operative contact, preferably direct bonding contact, with a major planar surface of the melt barrier layer and the other major planar surface of the intermediate core layer is in operative contact, preferably direct adhesive contact, with a major planar surface of the adhesive film layer.

Individual layer thickness, while not particularly critical, can be chosen to control film manufacturing costs, or one or more physical or mechanical properties of the film. Components of the adhesive film layer tend to have a higher raw material cost. This factor alone motivates one to use an adhesive film layer that functions as an adhesive, yet is as thin as possible. Based upon total multilayer film thickness, the adhesive film layer has a thickness that preferably ranges from 10% to 30%, more preferably from 15% to 25%, and most preferably at or near 20%. The thickness of the other layers can be tuned to provide other potentially desirable physical properties such as curl, tensile strength, tear properties, or stiffness. For a two layer film that includes an adhesive film layer and a melt barrier layer, the melt barrier layer has a thickness that complements the adhesive film layer thickness such that the thicknesses total 100%. As such, the melt barrier layer has a thickness, based upon total multilayer film thickness, that preferably ranges from 70 to 90%, more preferably from 75% to 85%, and most preferably at or near 80%. In a three layer multilayer film with an adhesive film layer, an intermediate core layer and a melt barrier layer, relative layer thicknesses, based upon total multilayer film thickness, preferably range from 10% to 30% adhesive film layer, from 40% to 80% intermediate core layer and from 10% to 30% melt barrier layer, more preferably from 15% to 25% adhesive film layer, from 50% to 70% intermediate core layer and from 15% to 25% melt barrier layer. A particularly suitable structure includes, based upon total multilayer film thickness, 20% adhesive film layer, 60% intermediate core layer and 20% melt barrier layer. In each instance, select individual layer thicknesses to provide a total of 100%.

Multilayer film structures of the present invention have a total thickness that is preferably within a range of 0.5 mil (0.013 mm) to 15 mil (0.38 mm), more preferably within a range of from 1 mil (0.025 mm) to 10 mils (0.25 mm), and most preferably within a range of from 1.5 mil (0.04 mm) to 5 mils (0.13 mm).

*FILM EXTRUSION MANUAL, Process Materials, Properties,* prepared by the Film Extrusion Committee of the Polymers, Laminations and Coatings Division, TAPPI, and edited by Thomas I. Butler and Earl W. Veazey, TAPPI Press, 1992, particularly in Chapter 3, discusses film extrusion processes, particularly blown film and cast film processes. The teachings of this manual are incorporated by reference herein to the maximum extent permitted by law. Both processes permit recycling of scrap film and edge trim to maximize use of polymer. Blown film production involves extruding molten polymer through an annular opening to form a hot tube of polymer. The tube is then cooled and collapsed into an envelope shape. By way of contrast, cast film is extruded through a flat die with a thin wide opening. The flat curtain of film is cooled rapidly and then sent on for further processing.

Extrusion provides an even, consistent flow of polymer melt to a forming die and uses, what may also be referred to as a screw pump that includes a constant diameter screw, to convey polymer from a feed port to a discharge end. By adding energy to the polymer in the form of shear and heat, one melts the polymer. Polymer compression occurs as extruder screw root diameter increases toward the discharge end.

In a blown film bubble process, a quantity of air is injected into the center of the hot tube of polymer to inflate it to a desired diameter. Prior to inflation, the tube has a typical thickness that ranges from 0.028 inch (0.7 millimeter (mm)) to over 0.1 inch (2.5 mm). After the inflated tube is cooled and collapsed into an envelope shape, it passes through a set of nip rolls before it is slit and wound up.

In the cast film process, extrudate from the die has a thickness that typically ranges from 0.01 inch (0.25 mm) to 0.025 inch (0.63 mm). In chill roll cast extrusion, the extrudate is cast directly onto a polished roll that is chilled via an internal cooling mechanism. An air knife may be used to ensure contact of the extrudate with the chill roll and provide additional cooling.

The melt barrier layer comprises at least one polymer selected from the group consisting of linear low density polyethylene (LLDPE), ultra low density polyethylene (ULDPE), low density polyethylene (LDPE), high density polyethylene (HDPE), polypropylene homopolymer (PP), propylene copolymers (either random, mini-random or impact copolymers), a homogeneous ethylene/alpha-olefin (EAO) copolymer, a metallocene-catalyzed EAO copolymer or a substantially linear ethylene/alpha olefin (SLEP) copolymer wherein the alpha olefin (AO or α-olefin) contains from 3 to 20 carbon atoms ($C_{3-20}$). Suitable α-olefins are aliphatic α-olefins containing from 3 to 20, preferably from 3 to 12, more preferably from 3 to 8 carbon atoms ($C_{3-20}$, $C_{3-12}$, $C_{3-8}$). As used herein, subscripts indicate the number of, for example carbon (C) atoms contained in a monomer. Particularly suitable α-olefins include ethylene, propylene, butene-1, 4-methyl-1-pentene, hexene-1 or octene-1, or ethylene in combination with one or more of propylene, butene-1, 4-methyl-1-pentene, hexene-1 and octene-1. The melt barrier layer has a melting point that exceeds the melting point for at least one component of the adhesive film layer and effectively prevents molten adhesive film layer polymer from migrating through the multilayer film structure to an external surface of such a structure.

For the purposes of this application, HDPE is a polyethylene (PE) that is commonly employed in the art or one with a density (ρ) of at least (≧) 0.94 grams per cubic centimeter (gms/cc or $g/cm^3$), LDPE is a PE having a ρ of from 0.91 to 0.94 gms/cc, LLDPE is a PE having much the same density as LDPE, but with short chain branches resulting from the presence of comonomer, and (ULDPE) is a polyethylene having a ρ of from 0.90 to 0.92 gms/cc. SLEPs display densities as low as 0.87 gms/cc, but those of particular interest in compositions of the present invention have densities of at least 0.91 gms/cc. The Dow Chemical Company produces and sells polymer resins made using INSITE® constrained geometry catalysts under the trade designation AFFINITY™. U.S. Pat. Nos. 5,272,236; 5,278,272, and 5,346,963, the disclosures of which are incorporated herein by reference to the maximum extent permitted by law detail preparation of SLEPs.

Polypropylene (PP) homopolymers and propylene copolymer resins provide satisfactory results when used as the linear polyolefin resin. U.S. Pat. No. 5,527,573 discloses suitable propylene polymer materials at column 3, lines 27-52, the teachings of which are incorporated herein by reference. The propylene polymer materials include (a) propylene homopolymers, (b) random and block copolymers of propylene and an olefin selected from ethylene, 1-olefins (α-olefins) containing 4 to 10 carbon atoms ($C_{4-10}$) and $C_{4-10}$ dienes, and (c) random terpolymers of propylene and two monomers selected from ethylene and $C_{4-10}$ α-olefins. The $C_{4-10}$ α-olefins may be linear or branched, but are preferably linear. Suitable propylene polymer materials have a melt flow rate or MFR (ASTM D-1238, Condition 230° C./2.16 kilograms (kg)) of 0.01-100 grams per ten minutes (g/10 min), preferably 0.01-50 g/10 min, more preferably 0.05-10 g/10 min, and still more preferably 0.1 to 3 g/10 min.

The PP and propylene copolymer resins may, if desired, be high melt strength resins prepared by a branching method known in the art. The methods include irradiation with high energy electron beam (U.S. Pat. No. 4,916,198), coupling with an azidofunctional silane (U.S. Pat. No. 4,714,716) and reacting with a peroxide in the presence of a multi-vinyl functional monomer (EP 879,844-A1). Satisfactory results follow, however, from use of less expensive resins or additives.

The intermediate core layer may, and preferably does, comprise any one or more of the polymers found in the melt barrier layer. By selecting at least some of the same polymers, one facilitates incorporation of regrind or recycle material into the multilayer film structure.

The multilayer film structures of the present invention have a variety of utilities that range from use as a pressure sensitive adhesive film through use as a strippable, adhesive protective film for any of a number of surfaces. The surfaces, in turn, range from cellulosic material surfaces, such as paper or wood products, through painted surfaces, including painted or coated substrate surfaces. They find particular utility as strippable adhesive and protective films for freshly painted acrylic paint surfaces, including partially cured acrylic paint surfaces that are being laminated at a film temperature at or above 160° F. (71.1° C.).

The strippable adhesive film has a 170° Fahrenheit (° F.) (77° C.) hot bar seal bond strength to a surface selected from the group consisting of paper, polymethylmethacrylate sheet and acrylic paint with a ten second seal time that is greater than the 170° F. (77° C.) hot bar seal bond strength of a multilayer film structure having the same melt barrier layer, and, when present, the same intermediate core layer, but with an adhesive layer that contains the same ethylene/α,β-ethylenically unsaturated acid copolymer and is substantially free of ethylene/alkyl acrylate copolymer.

If desired, one may incorporate into at least one of the adhesive film layer and the melt barrier layer further a surface roughening additive selected from the group consisting of mica, talc or an inorganic particulate material. The surface roughening additive has an average particle size that is preferably within a range of from 0.5 micrometer (μm) to 3 μm, more preferably within a range of from 0.8 μm to 2.5 μm and still more preferably within a range of from 1 μm to 2 μm. When present in a layer of the multilayer film structure, preferred surface roughening additive contents range from 0.5 wt % to 3 wt %, based upon weight of the layer.

The following examples illustrate, but do not in any way limit, the present invention. Arabic numerals represent examples (Ex) of the invention and letters of the alphabet designate comparative examples (Comp Ex). All parts and percentages are by weight unless otherwise stated. In addition, all amounts shown in the tables are based on weight of polymer contained in the respective compositions unless otherwise stated.

EX 1

Coextrude a multilayer film having an ABB structure (making it a two-layer film based upon differences in layer composition) with an overall gauge of 1.5 mil (38 μm) using a conventional upward blown film line equipped with a 2 inch (in.) (5.08 centimeter (cm)) diameter die and three 0.75 in. (1.91 cm) extruders. Layer "A" comprises 25% (0.38 mil, 9.7 μm) of the overall film gauge, and the core and innermost "B" layers comprise 75% (1.12 mil, 28 μm) of the film thickness. Layer "A", nominally an "adhesive layer", comprises, based on total layer weight, 75 wt % EMA resin (commercially available from Atofina under the trade designation LOTRYL™ 28MA07) (Vicat point of <40° C.), 10 wt % of EAA resin (20.5 wt % AA content, commercially available from The Dow Chemical Company under the trade designation PRIMACOR™ 5980), 10 wt % LDPE (commercially available from The Dow Chemical Company under the trade designation 5004i), and 5 wt % of an antiblock concentrate in LDPE (commercially available from Ampacet under the trade designation CN-734). Layer "B" comprises, based upon total layer weight, 75 wt % LLDPE (commercially available from The Dow Chemical Company under the trade designation DOWLEX™ 2247G), 22.5 wt % LDPE (commercially available from The Dow Chemical Company under the trade designation 681i), and 2.5 wt % of a mica concentrate (a 40% by weight dispersion of mica in HDPE commercially available from Dupont Canada Inc. under the trade designation MICAFIL™ 40).

Zone ramp the two extruders that feed layer "B" from 340° F. (171° C.) to 400° F. (204° C.) and the extruder that feeds layer "A" from 320° F. (160° C.) to 380° F. (193° C.), with die zones set at 420° F. (216° C.). This produces a 6 in (15.2 cm) wide lay-flat bubble.

Using a Sentinel™ Brand Heat Sealer Model 1212ASD available from Packaging Industries Group, Inc. of Hyannis, Mass. 02601 heat seal apparatus with a bar temperature set at 170° F., an applied pressure of 30 pounds per square inch (psi) (207 kilopascals (kPa)) and a dwell time of three seconds, effect a bond between layer "A" of the multilayer film structure and paper (Xerox brand Business Multipurpose 4200 copier paper 20 lb (75 g/m$^2$)). Remove the multilayer film-paper combination from the apparatus and allow it to cool to ambient temperature (nominally 25° C.) and then test its peel strength using procedures outlined in ASTM D1525. The room temperature peel strength is 32.1 grams (g).

Using procedures outlined in ASTM D882, determine Ultimate Tensile Strength (UTS) in terms of both psi and Newtons per square millimeter (N/mm$^2$), Ultimate Elongation (UE) in terms of %, 2% Secant Modulus in terms of psi and N/mm$^2$, and use ASTM D1922 to determine Elmendorf Tear Strength (ETS) in terms of g/mil (g/μm), in each case in both the machine direction (MD) and transverse direction (TD). Summarize the data in Table I below.

TABLE I

|  | MD | TD |
|---|---|---|
| UTS (psi (N/mm$^2$)) | 3,090 (21.3) | 2,710 (18.7) |
| Ultimate Elongation (%) | 515 | 590 |
| 2% Secant Modulus (psi/(N/mm$^2$)) | 19,920 (137.3) | 24,510 (169.0) |
| ETS (g/mil/(g/μm)) | 160 (6.3) | 520 (20.4) |

EX 2

With certain changes, replicate Ex 1 to produce a two-layer 2.4 mil (61 μm) multilayer film structure. Change relative layer thickness so that layer A comprises 40% (0.96 mil, 24 μm) of the overall film gauge, and layer B comprises 60% (1.44 mil, 37 μm) of the film thickness. Change layer A composition to 60 wt % of the same EMA resin as in Ex 1 and 40 wt % of the same EAA resin as in Ex 1, in both cases based upon total layer weight. Change zone ramping for layer A to from 280° F. (138° C.) to 350° F. (177° C.) and reduce the die zone set temperature to 400° F. (204° C.). The changes yield a 5 in (12.7 cm) wide lay-flat bubble. The room temperature peel load is 106.8 g. Summarize mechanical property data determined as in Ex 1 in Table II below.

TABLE II

|  | MD | TD |
|---|---|---|
| UTS (psi (N/mm$^2$)) | 2,580 (17.8) | 1,320 (9.1) |
| Ultimate Elongation (%) | 500 | 370 |
| 2% Secant Modulus (psi/(N/mm$^2$)) | 13,990 (96.5) | 14,570 (100.5) |
| ETS (g/mil/(g/μm)) | 60 (2.4) | 350 (13.8) |

EX 3

With certain changes, replicate Ex 2 to produce a two-layer 1.8 mil (46 μm) multilayer film structure. With the change in multilayer film thickness, layer A has a thickness of 0.96 mil (24 μm) and layer B has a thickness of 1.44 mil (37 μm). Modify layer A composition so that it contains 44 wt % of the same EMA as in Ex 1, 36 wt % of the same EAA as in Ex 1 and 20 wt % of a ethylene/propylene elastomer having 15 wt % ethylene based on the weight of the copolymer, a Melt Flow (ASTM D1238), 2.16 Kg at 230° C., of 8 and a Vicat point of 20° C. (available from The Dow Chemical Company under the trade designation Versify DE3400), each wt % being based upon total layer A weight. Modify layer B so that it contains 48 wt % of the same LLDPE as in Ex 1, 25 wt % ULDPE (commercially available from The Dow Chemical Company under the trade designation ATTANE™ 4201), 25 wt % HDPE (commercially available from Equistar under the trade designation ALATHON™ M6210) and 2 wt % of the same mica concentrate as in Ex 1, each wt % being based upon total layer B weight. Change zone ramping for layer A to from 300° F. (149° C.) to 360° F. (182° C.) and zone ramping for layer B to from 330° F. (166° C.) to 400° F. (204° C.). The changes yield the same size lay-flat bubble as in Ex 2. The room temperature peel load is 242.9 g. Summarize mechanical property data determined as in Ex 1 in Table III below.

TABLE III

|  | MD | TD |
|---|---|---|
| UTS (psi (N/mm$^2$)) | 2,380 (16.4) | 2,020 (13.9) |
| Ultimate Elongation (%) | 490 | 575 |
| 2% Secant Modulus (psi/(N/mm$^2$)) | 17,110 (118.0) | 24,610 (169.7) |
| ETS (g/mil/(g/μm)) | 105 (4.1) | 450 (17.7) |

EX 4

With several changes, replicate Ex 2 to yield a coextruded 3-layer 2.4 mil (61 μm) film having an ABC structure. Layers A, B, and C have respective relative and absolute thicknesses as follows: outermost layer A comprises 20% (0.48 mil, 12 μm) of the overall film gauge, central or core layer B comprises 60% (1.44 mil, 37 μm) of the film thickness, and the innermost C layer comprises 20% (0.48 mil, 12 μm) of the film thickness. Layer A comprises 58 wt % of the same EMA resin as in Ex 1, 38 wt % of the same EAA resin as in Ex 1 and 4 wt % of same mica concentrate as in Ex 1. Layer B comprises 60 wt % of the same LLDPE as in Ex 1, 20 wt % of the same LDPE as in Ex 2, and 20 wt % of HDPE (commercially available from The Dow Chemical Company (Union Carbide Corporation) under the trade designation DMDA 8907 NT7). Layer C comprises 100 wt % of the same HDPE as in layer B. In each case, wt % values are based on total layer weight. Zone ramp the extruders feeding the three layers as follows: layer A—from 280° F. (138° C.) to 320° F. (160° C.); layer B—from 330° F. (166° C.) to 400° F. (204° C.); and layer C—from 330° F. (166° C.) to 400° F. (204° C.), with the die zones set at 400° F. (204° C.). The changes yield the same size lay-flat bubble as in Ex 2. The room temperature peel load is 339.2 g. Summarize mechanical property data determined as in Ex 1 in Table IV below.

TABLE IV

|  | MD | TD |
|---|---|---|
| UTS (psi (N/mm$^2$)) | 2,770 (19.1) | 2,150 (14.8) |
| Ultimate Elongation (%) | 590 | 620 |
| 2% Secant Modulus (psi/(N/mm$^2$)) | 25,100 (173.1) | 25,160 (173.5) |
| ETS (g/mil/(g/μm)) | 60 (2.4) | 530 (20.9) |

EX 5

Coextrude a 3-layer 2.0 mil (50 μm) film using a conventional upward blown film line equipped with a 22 in (55.9 cm) diameter die, four 7.5 cm (2.95 inch) extruders and one 10 cm (3.94 inch) extruder. The film has a nominal ABC structure where outermost layer A comprises 15% (0.30 mil, 7.5 μm) of the overall film gauge, central or core layer B comprises 65% (1.30 mil, 32.5 μm) of the film thickness, and innermost layer C comprises 20% (0.40 mil, 10 μm) of the film thickness. Layer A comprises 60 wt % of the same EMA resin as in Ex 1 and 40 wt % of the same EAA resin as in Ex 1. Core layer B, fed by three extruders (two 7.5 cm extruders and the 10 cm extruder) comprises 60 wt % of the same LDPE as in Ex 2 (681i from Dow), 20 wt % of the same LLDPE as in Ex 1 and 20 wt % HDPE (commercially available from Equistar under the trade designation ALATHON™ M6060). Layer C comprises 100 wt % of the same HDPE as in layer B. Ramp the extruders feeding the layers as follows: layer A—from 260° F. (127° C.) to 320° F. (160° C.); layer B—from 260° F. (127°

C.) to 320° F. (160° C.); and layer C—from 230° F. (110° C.) to 250° F. (121° C.). Set the die zones at 320° F. (160° C.). This produces a 84 in (2.13 m) wide lay-flat bubble. The room temperature peel load is 203.2 g. Summarize mechanical property data determined as in Ex 1 in Table V below.

TABLE V

|  | MD | TD |
| --- | --- | --- |
| UTS (psi (N/mm$^2$)) | 2,760 (19.0) | 2,590 (17.9) |
| Ultimate Elongation (%) | 410 | 670 |
| 2% Secant Modulus (psi/(N/mm$^2$)) | 37,980 (261.9) | 46,980 (323.9) |
| ETS (g/mil/(g/μm)) | 85 (3.3) | 350 (13.8) |

Comp Ex A

Coextrude a 2-layer 1.0 mil (25 μm) film using a conventional upward blown film line equipped with a 22 in (55.9 cm) diameter die, a 4.5 inch (11.4 cm) extruder and a 3 inch (7.6 cm) extruder. The film has an AB structure with layer A comprising 25% (0.25 mil, 6.25 μm) of the overall film gauge and layer B comprising 75% (0.75 mil, 18.75 μm) of the film thickness. Layer A comprises 60 wt % of the same EAA resin as in Ex 1, 20 wt % of the same LDPE as in Ex 1, 15 wt % of a second EAA resin (6.5 wt % AA content, commercially available from The Dow Chemical Company under the trade designation PRIMACOR™ 3330) and 5 wt % of the same antiblock concentrate as in Ex 1. Layer B comprises 48 wt % of the same LDPE as in Ex 2, 25 wt % of the same ULDPE as in Ex 3, 25 wt % of the same HDPE as in Ex 5, and 2 wt % of the same antiblock concentrate as in layer A. Ramp the extruders feeding the layers as follows: layer A—from 240° F. (116° C.) to 280° F. (138° C.); and layer B—from 260° F. (127° C.) to 315° F. (157° C.). Set the die zones set at 320° F. (160° C.). This produces a 70 in (1.78 m) wide lay-flat bubble. The room temperature peel load is 39.7 g. Summarize mechanical property data determined as in Ex 1 in Table VI below.

TABLE VI

|  | MD | TD |
| --- | --- | --- |
| UTS (psi (N/mm$^2$)) | 2,990 (20.6) | 1,960 (13.5) |
| Ultimate Elongation (%) | 155 | 390 |
| 2% Secant Modulus (psi/(N/mm$^2$)) | 38,800 (267.5) | 49,800 (343.3) |
| ETS (g/mil/(g/μm)) | 11 (0.4) | 340 (13.4) |

Evaluation of Adhesion to Polymethylmethacrylate (PMMA) Sheet

Evaluate adhesion of the multilayer film structures of Examples 1-4 to PMMA sheet (more commonly known as "PLEXIGLASS" or "acrylic sheet") and compare that to adhesion of a film that contains EAA copolymer of and does not contain a polymer with a Vicat point less than 40° C. (Comp Ex A). When sold, PMMA sheet typically has a protective film coating on at least one major planar surface. Cut a 0.08 inch (2.03 mm) thick PMMA sheet into test pieces measuring 2 inches (5.08 centimeters (cm)) by 6 inches (15.24 cm). Prepare the test pieces for adhesion testing by removing the protective film. Cut strips measuring 1 inch (2.5 cm) by 7 inches (17.8 cm) from each of Ex 1-4 and Comp Ex A.

Using the same heat seal apparatus and applied pressure as in Ex 1, evaluate film strip adhesion at 170° F. (77° C.) and a dwell time of 15 seconds (sec). The apparatus has a temperature control and a clamp pressure control that includes a timer to release clamp pressure at a given time to provide the dwell time.

Use an Instron Model 1123 constant rate test machine equipped with a 50 pound (110 kilogram (kg)) load cell and Instron series 4 automated materials tester software version 8.11.01. Use an Instron Model 3119-005 environmental chamber that employs liquid nitrogen and coil heaters to control test chamber temperature.

Fix each sample for testing in the test chamber using a self-centering clamp device that allows the test piece to move freely only in a horizontal direction. Clamp a free edge of the film structure to be tested into a spring clamp connected to the load cell and pull the film from the PMMA sheet at an angle of 90° (relative to the PMMA sheet surface) at a strain rate of 20 in/minute (51 cm/minute). Stop pulling the film structure from the PMMA sheet surface after removing approximately 4 inches (10.2 cm) of film structure from the PMMA sheet and record pull test data in terms of average kilograms (kg) force across the full tested surface. Summarize test data (rounded to the nearest whole number) for PMMA adhesion testing together with room temperature (nominally 25° C.) peel test data from Ex 1-4 in Table VII below. Table VII also includes room temperature peel test data for Comp Ex A.

TABLE VII

| Ex or Comp Ex Number | 72° F. (25° C.) Peel (paper substrate) | 0° F. (−18° C.) Peel (PMMA substrate) |
| --- | --- | --- |
| Comp A | 40 | 18 |
| Ex 1 | 32 | 285 |
| Ex 2 | 107 | 24 |
| Ex 3 | 243 | 140 |
| Ex 4 | 339 | 43 |

The data in Table VII illustrate several key points. First, a comparison of room temperature peel (paper substrate) data for Ex 2-4 and Comp Ex A show that adhesive film layers of multilayer film structures of the present invention provide markedly increased adhesion relative to an adhesive film layer that contains only ethylene/acrylic acid copolymer (no ethylene/alkyl acrylate copolymer or polyolefin elastomer). The room temperature peel for Ex 1 shows that it is possible to provide a range of adhesion values by varying the amount of ethylene/alkyl acrylate copolymer in the adhesive film layer. Second, a comparison of PMMA sheet adhesion data shows that adhesive film layers of the present invention provide improved adhesion to PMMA sheet over that of an ethylene/acrylic acid adhesive film layer. Again, a range of adhesion values may be obtained by varying ethylene/alkyl acrylate content of the adhesive film layer. Similar results are expected with other compositions that fall within the scope of the appended claims.

The invention claimed is:

1. A multilayer film having at least two layers including at least one adhesive layer of a polymer blend consisting of (a) an ethylene/methyl acrylate copolymer having a Vicat point (ASTM D1525) of no more than 40° centigrade and which has a methyl acrylate content of from 26 percent by weight to 31 percent by weight, based upon copolymer weight; (b) an ethylene/acrylic acid copolymer having an acrylic acid content within a range of from greater than or equal to 5 percent by weight to less than or equal to 22 percent by weight, based upon copolymer weight, and (c) an amount of a polyolefin elastomer, the amount of polyolefin elastomer being less than 30 percent by weight, wherein the polyolefin elastomer is an ethylene/propylene elastomer having a ethylene content within a range of from 5 percent by weight to 20 percent by weight, based on polyolefin elastomer weight, and a Vicat point of no more than 40° centigrade; the amount of ethylene/methyl acrylate copolymer plus polyolefin elastomer being within a range of from 50 percent by weight to 75 percent by weight, and the amount of ethylene/acrylic acid copolymer being within a range of from 25 percent by weight to 50 percent by weight, in each case based upon total polymer blend weight and wherein the multilayer film is a strippable film.

2. The multilayer film of claim 1 further comprising a melt barrier layer, the melt barrier layer having a first major planar surface and, spaced apart from and generally parallel to the first major planar surface, a second major planar surface, wherein the adhesive film layer has a first major planar surface and, spaced apart from and generally parallel to the first major planar surface, a second major planar surface, a major planar surface of the melt barrier layer being directly bonded to a major planar surface of the adhesive film layer, a melt barrier layer being a layer that effectively prevents molten adhesive film layer polymer from migrating through the multilayer film to an external surface thereof.

3. The multilayer film of claim 2, further comprising an intermediate core layer, the core layer being disposed between, and bonded to, the melt barrier layer and the adhesive film layer, the intermediate core layer having a first major planar surface and, spaced apart from and generally parallel to the first major planar surface, a second major planar surface, one of the two major planar surfaces of the intermediate core layer being proximate to, and bonded to, a major planar surface of the melt barrier layer and the other of the two major planar surfaces of the intermediate core layer being proximate to, and bonded to, a major planar surface of the adhesive film layer.

4. The multilayer film of claim 3, wherein the intermediate core layer comprises at least one polymer selected from the group consisting of linear low density polyethylene, ultra low density polyethylene, low density polyethylene, high density polyethylene, polypropylene homopolymer, ethylene/propylene copolymers that have a polymerized ethylene monomer content within a range of from 11 wt % to 4 wt %, based on copolymer weight, a homogeneous ethylene/alpha-olefin copolymer, a metallocene-catalyzed ethylene/alpha-olefin copolymer and a substantially linear ethylene/alpha olefin copolymer wherein the alpha olefin contains from 3 to 20 carbon atoms.

5. The multilayer film of claim 4, wherein the intermediate core layer further comprises an amount of recycled multilayer film structure.

6. The multilayer film of claim 3 wherein the melt barrier layer comprises high density polyethylene, the intermediate core layer comprises at least one polymer selected from the group consisting of linear low density polyethylene, ultra low density polyethylene, low density polyethylene, high density polyethylene, polypropylene homopolymer, ethylene/propylene copolymers that have a polymerized ethylene monomer content within a range of from 1 wt % to 4 wt %, based on copolymer weight, a homogeneous ethylene/alpha-olefin copolymer, a metallocene-catalyzed ethylene/alpha-olefin copolymer and a substantially linear ethylene/alpha olefin copolymer wherein the alpha olefin contains from 3 to 20 carbon atoms; and the adhesive layer polymer blend has a Vicat point of no more than 40° C.

7. The multilayer film of claim 2, wherein the melt barrier layer comprises at least one polymer selected from the group consisting of linear low density polyethylene, ultra low density polyethylene, low density polyethylene, high density polyethylene, polypropylene homopolymer, ethylene/propylene copolymers that have a polymerized ethylene monomer content within a range of from 5 wt % to 20 wt %, based on copolymer weight, a homogeneous ethylene/alpha-olefin copolymer, a metallocene-catalyzed ethylene/alpha-olefin copolymer and a substantially linear ethylene/alpha olefin copolymer wherein the alpha olefin contains from 3 to 20 carbon atoms.

8. The multilayer film of claim 2, wherein at least one of the adhesive film layer and the melt barrier layer further comprises a surface roughening additive selected from the group consisting of mica, talc and an inorganic particulate material, the surface roughening additive having an average particle size within a range of from 0.5 micrometer to 3 micrometers.

9. The multilayer film of claim 8, wherein the surface roughening additive is present in at least one of the adhesive layer and the melt barrier layer, in each case in an amount within a range of from 0.5 to 3 percent by weight, based upon weight of the layer.

10. The multilayer film of claim 1, wherein the film has a 170° Fahrenheit (77° centigrade) hot bar seal bond strength to a surface selected from the group consisting of paper, polymethylmethacrylate sheet and acrylic paint with a ten second seal time that is greater than the 170° Fahrenheit (77° centigrade) hot bar seal bond strength of a multilayer film structure having the same melt barrier layer, and, when present, the same intermediate core layer, but with an adhesive layer that contains the same ethylene/acrylic acid copolymer and is substantially free of the ethylene/methyl acrylate copolymer.

11. The multilayer film of claim 1 having a melt barrier layer, a melt barrier layer being a layer that effectively prevents molten adhesive film layer polymer from migrating through the multilayer film to an external surface thereof.

12. A multilayer film comprising at least one melt barrier layer, a melt barrier layer being a layer that effectively prevents molten adhesive film layer polymer from migrating through the multilayer film to an external surface thereof and at least one adhesive layer made of a polymer blend consisting of (a) an ethylene/methyl acrylate copolymer having a Vicat point (ASTM D1525) of no more than 40° centigrade and which has a methyl acrylate content of from 26 percent by weight to 31 percent by weight, based upon copolymer weight, and (b) an ethylene/acrylic acid copolymer having an acrylic acid content within a range of from greater than or equal to 5 percent by weight to less than or equal to 22 percent by weight, based upon copolymer weight, and (c) at least one polyolefin elastomer in an amount of up to 30 percent by weight, based on weight of the total polymer blend wherein the polyolefin elastomer is an ethylene/propylene elastomer having a ethylene content within a range of from 5 percent by weight to 20 percent by weight, based on polyolefin elastomer weight, and a Vicat point of no more than 40° centigrade; the amount of ethylene/methyl acrylate copolymer plus polyolefin elastomer being within a range of from 50 percent by weight to 75 percent by weight, and the amount of ethylene/acrylic acid copolymer being within a range of from 25 percent by weight to 50 percent by weight, in each case based upon total polymer blend weight and wherein the multilayer film is a strippable film.

13. The multilayer film of claim 12 wherein the melt barrier layer comprises at least one polymer selected from the group consisting of linear low density polyethylene, ultra low density polyethylene, low density polyethylene, high density polyethylene, polypropylene homopolymer, propylene copolymers selected from random, mini-random or impact copolymers of propylene, homogeneous ethylene/alpha-olefin copolymers, metallocene-catalyzed ethylene/alpha-olefin copolymers and substantially linear ethylene/alpha olefin copolymers wherein the alpha olefin contains from 3 to 20 carbon atoms.

14. A process of applying a multilayer film comprising at least one adhesive layer and at least one melt barrier layer to at least one surface by lamination at a film temperature at or above 71.1° C. wherein the adhesive layer consists of (a) an ethylene/methyl acrylate copolymer having a Vicat point (ASTM D1525) of no more than 40° centigrade and which has a methyl acrylate content of from 26 percent by weight to 31 percent by weight, based upon copolymer weight; and (b) an ethylene/acrylic acid copolymer having an acrylic acid content within a range of from greater than or equal to 5 percent by weight to less than or equal to 22 percent by weight, based upon copolymer weight, and (c) an amount of a polyolefin elastomer, the amount of polyolefin elastomer being less than 30 percent by weight, wherein the polyolefin elastomer is an ethylene/propylene elastomer having a ethylene content within a range of from 5 percent by weight to 20 percent by weight, a based on polyolefin elastomer weight, and a Vicat point of no more than 40° centigrade; the amount of ethylene/methyl acrylate copolymer plus polyolefin elastomer being within a range of from 50 percent by weight to 75 percent by weight, and the amount of ethylene/acrylic acid copolymer being within a range of from 25 percent by weight to 50 percent by weight in each case based upon total polymer blend weight and wherein the multilayer film is a strippable film.

15. The process of claim 14 wherein the multilayer film is applied to at least one painted wood surface, painted wood product surface, painted cementitious surface, painted metal surface, or plastic surface.

\* \* \* \* \*